UNITED STATES PATENT OFFICE.

FREDERICK R. TAYLOR, OF NEW YORK, N. Y.

IMPROVED INDIA-RUBBER TUBING.

Specification forming part of Letters Patent No. 42,972, dated May 31, 1864.

*To all whom it may concern:*

Be it known that I, FREDERICK R. TAYLOR, of the city, county, and State of New York, have invented a certain new and useful Article of Manufacture Consisting of Flocked India-Rubber Tubing; and I do hereby declare the following to be a full, clear, and exact description of the manner of making the said article of manufacture.

To produce my new article of manufacture I first take raw gum—either india-rubber or gutta-percha—and dissolve it in any of the known solvents, so as as to form a cement of about the consistency of paint when prepared by the painter for use. This cement or paste I put into a reservoir of suitable construction, and through it I pass the tubing, so as to give it a uniform coat of the cement. I then apply the flocking by dusting it on or in any effectual way before the cement dries. As soon as the first coat of cement and flock has become "set"—that is, partially dried—the tubing is again passed through the cement and a second coat of flocking is applied, as before. This completes the operation, unless it is desired to vulcanize or cure the rubber thus applied to the already vulcanized tubing. This may be done without injury to the original tubing by introducing it into the vulcanizing-chamber and applying a high heat thereto, by which the thin layer of rubber cement on the outside of the tubing will be quickly vulcanized without affecting the tubing, unless it be left too long in the heat; or the applied rubber may be cured by immersing the tubing in nitric acid of the ordinary commercial strength for about fifteen seconds, and then in a moderately strong solution of chloride of lime and water for about thirty seconds, repeating the application of the acid and lime-water three or four times, or until the applied rubber is thoroughly cured.

In practice it may not be necessary to either vulcanize or cure the applied rubber. I think by simply drying it after the flock has been applied will be all that is necessary to make it adhere with sufficient tenacity.

Having now described the manner of making my new article of manufacture, what I claim, and desire to secure by Letters Patent, is—

The manufacture of the new article known as "flocked" india-rubber tubing.

FREDERICK R. TAYLOR.

Witnesses:
    AMOS BROADNAX,
    ED. BARTLETT.